United States Patent [19]

Vipond et al.

[11] Patent Number: 4,470,433
[45] Date of Patent: Sep. 11, 1984

[54] HOSE

[76] Inventors: Stanley N. Vipond; Craig J. Litster, both of c/o Dunlop Limited of 2 Parade, Sutton Coldfield, West Midlands, England

[21] Appl. No.: 397,224

[22] Filed: Jul. 12, 1982

[30] Foreign Application Priority Data

Jul. 17, 1981 [GB] United Kingdom ............... 8122117

[51] Int. Cl.³ .............................................. F16L 11/12
[52] U.S. Cl. ....................................... 138/106; 174/47
[58] Field of Search .................... 174/41, 47; 138/103, 138/106, 107

[56] References Cited

U.S. PATENT DOCUMENTS

| 2,013,724 | 9/1935 | Brady | 138/107 |
| 2,034,928 | 3/1936 | St. John | 138/107 |
| 2,258,508 | 10/1941 | Kerchner | 138/107 |
| 3,048,358 | 8/1962 | Raulins et al. | 174/47 |
| 3,327,049 | 6/1967 | Brown et al. | 174/47 |
| 4,064,601 | 12/1977 | Miyagishima | 174/47 |
| 4,262,703 | 4/1981 | Moore et al. | 138/115 |
| 4,361,937 | 12/1982 | Davis | 174/47 |

FOREIGN PATENT DOCUMENTS

| 1228469 | 11/1966 | Fed. Rep. of Germany . |
| 2246217 | 3/1974 | Fed. Rep. of Germany . |
| 2360754 | 6/1975 | Fed. Rep. of Germany . |
| 2440465 | 5/1980 | France . |
| WO80/00727 | 4/1980 | PCT Int'l Appl. . |
| 782670 | 9/1957 | United Kingdom . |
| 1118044 | 6/1968 | United Kingdom . |
| 1336726 | 11/1973 | United Kingdom . |
| 1547114 | 6/1979 | United Kingdom . |

Primary Examiner—John W. Shepperd
Attorney, Agent, or Firm—Stevens, Davis, Miller & Mosher

[57] ABSTRACT

An elongate article, such as a pump power cable, is secured to a flexible hose, for example a layflat well riser hose, by providing the hose with integral support means such as a longitudinally extending rib and providing tie means to extend from the support means around at least part of the periphery of the hose to support the elongate article relative to the hose at a position which is remote from the support means. Preferably the elongate article is secured to the hose by a spaced series of tie means each arranged to encircle individually the hose and elongate article in a figure 8 configuration, with the elongate article lying diametrically opposite the support means.

18 Claims, 5 Drawing Figures

HOSE

This invention relates to hose and in particular, though not exclusively, to hose suitable for use as a well rising main to transport fluid to the ground surface from a submersible pump which is supported by the hose and which has been lowered into the well.

The use of flexible hose in contrast to intercoupled sections of steel pipe to connect from the pump to the ground surface has the advantage that it avoids the corrosion problems associated with steel pipework and is much quicker because it eliminates the need to couple successive pipe sections and lower them in stepwise manner down the well. Also there is eliminated the time consuming operation of uncoupling successive corroded steel pipe sections when it is required to remove the pump.

Although speedier pump installation and removal results from the use of flexible hose in contrast to sections of steel pipe, there remains a requirement to support and guide that power cable which is provided to conduct electrical power to the pump from the surface. The operation of simultaneously lowering a hose and cable can be particularly difficult because the cable needs to be attached at intervals to the hose for support and guidance. In addition, once the pump and hose rising main are installed the support and guidance are still required to stop the cable breaking under its own weight and ensure that there is no entanglement of the hose with the cable or any safety chain.

According to one aspect of the present invention a flexible hose has integral support means provided at least at intervals along the length of the hose and tie means extending from said support means around at least part of the periphery of the hose for supporting an elongate article relative to the hose at a position remote from said support means.

In accordance with another aspect of the present invention a method of supporting an elongate article relative to a flexible hose comprises providing a flexible hose of a kind having support means provided at least at intervals along the length of the hose, positioning the elongate article at a position remote from, and preferably substantially diametrically opposite, the support means, and securing tie means at intervals along the length of the hose to extend around at least part of the periphery of the hose between the support means and elongate article.

Preferably each tie means extends around the entire periphery of the hose so that each tie means supports the elongate article in a balanced manner. Alternatively the tie means may each extend around only part of the hose periphery in which case it is preferred that for a relatively balanced support successive tie means extend alternately in clockwise and anti-clockwise directions from the support means.

When fitting the tie means, the elongate article may be secured to the hose so as to lie in a slack condition, i.e. such that the length of the elongate article between successive points of location of the article with tie means is greater than the minimum distance, over the hose surface, between said points of location. Thus any stretching action of the hose due to internal pressurization or other axial load is not transmitted to the elongate article provided that there is sufficient slack.

A part of the tie means may lie between the hose and the elongate article. Preferably tie means individually encircle the hose and elongate article, thus resulting, in the case of a tie means formed from a strip of material, in a cross-over at that part of the tie means between the hose and elongate article.

The support means may be in the form of a rib extending continuously along the length of the hose, and more than one such rib may be provided. Instead of being in the form of a continuously extending rib the support means may comprise, for example, a series of location lugs.

Typically the support means may be formed of the polymeric or other material of which the hose wall is formed, and may incorporate a reinforcement. The reinforcement may be integral with the tubular reinforcement structure of the hose, or, more preferably, separate therefrom.

The support means may be integral with the tubular body of the hose either by being moulded integrally with the tubular body or by being united to the tubular body, e.g. by bonding or the use of adhesives, subsequent to construction of the tubular body of the hose.

To facilitate attachment of a power cable or other elongate article to the hose, the support means preferably is provided at intervals with location means, such as holes extending through the support means. A plurality of tie means may be used respectively to extend through or be attached to each of said holes and thereby secure an elongate article to the hose.

As an alternative to the provision of location means the support member may be formed of a material which is sufficiently incompressible to enable it to be firmly gripped by for example spring-loaded clips associated with the tie means.

Preferably the tie means is formed of elastic and flexible strip material so as readily to accommodate change in the cross-sectional shape of the hose in consequence of variations of internal pressure.

The invention is of particular value for securing an elongate article, such as a power cable, safety wire, or air line, to a flexible hose which extends vertically, but it may be employed also in applications where the flexible hose extends in a direction angled to the vertical.

The invention is of particular value also for securing an elongate article to a flexible hose of the layflat kind which in the absence of internal pressure undergoes a substantial change of shape compared with its shape when subject to internal pressure, and therefore does not permit satisfactory use of simple tie bands of a kind normally wound tightly around a rigid hose to effect required location.

One embodiment of the invention will now be described, by way of example, with reference to the accompanying diagrammatic drawings in which.

Figure 1:
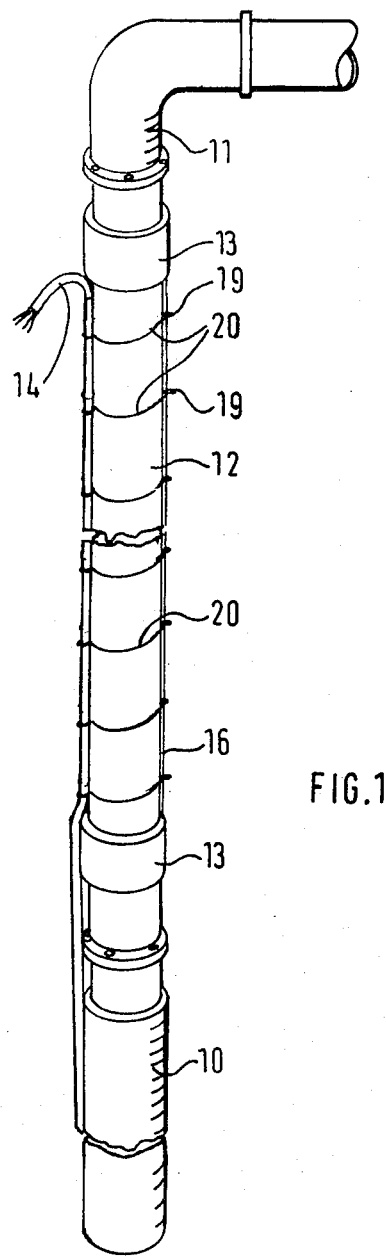
FIG. 1 shows schematically the layout of a hose in accordance with the present invention used to interconnect between a submersible pump and the ground surface.

Referring to FIG. 1 a submersible pump 10 is connected to ground level steel pipework 11 by means of a hose 12 which extends up the bore of the well (not shown). The hose is secured at its respective ends to the pump and ground level pipework by means of couplings 13.

Extending alongside the hose is a power cable 14 for the supply of power to the pump. The hose and the manner in which the cable is secured thereto will now be described.

Figure 2:
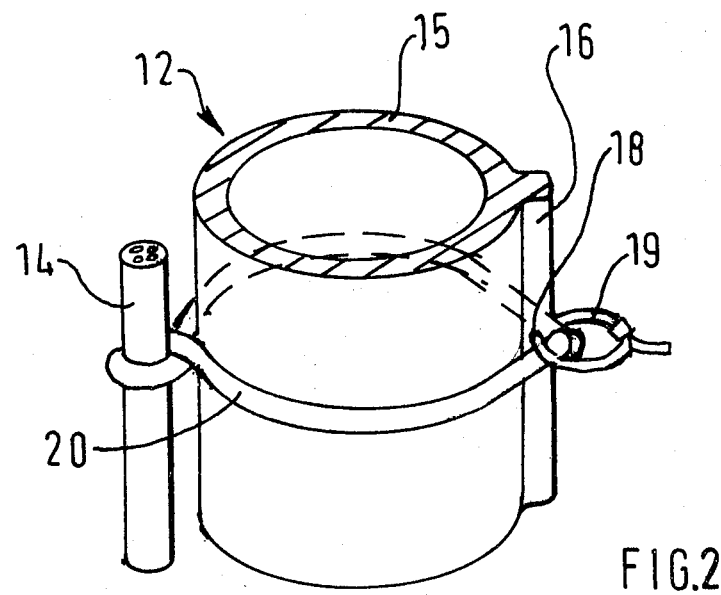
FIG. 2 is a perspective view showing part of the hose in accordance with the present invention having a power cable connected thereto.

The hose 12 (see FIG. 2) is of the thin walled layflat type and comprises a thermoplastic tubular body portion 15, typically of the material sold by DuPont under the name Hytrel having an embedded textile reinforcement structure (not shown) having both longitudinally and circumferentially or helically extending members. A suitable material for the reinforcement is Diolen.

Extending radially outwards, and moulded integrally with the tubular body portion 15, is a longitudinally extending rib 16 which serves as support means for the power cable.

Figure 3:
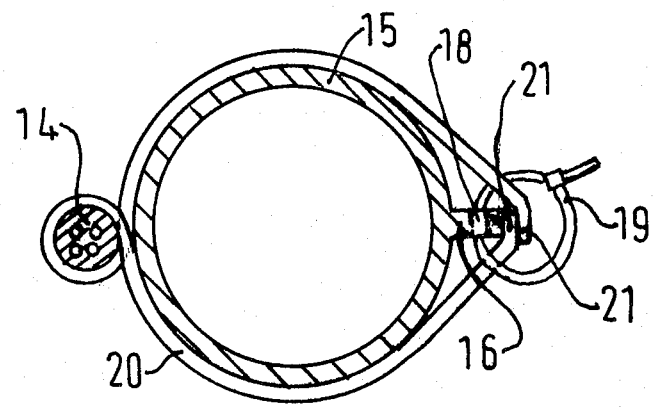
FIG. 3 is a cross-sectional view of the hose and cable assembly of FIG. 2 with the hose in a pressurized condition.
Figure 5:
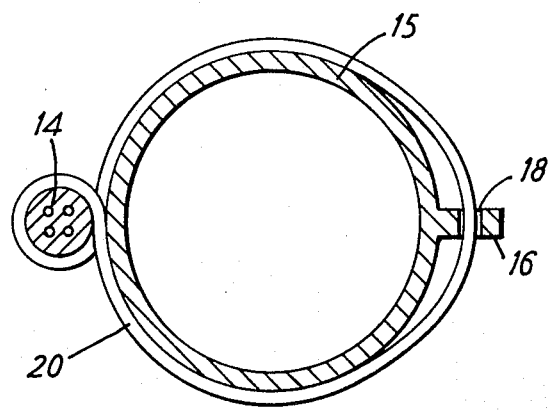
FIG. 5 is a cross-sectional view of the hose and cable with the tie means passing through a hole in the rib.

At intervals along its length the rib is formed with holes 18 which extend through the thickness of the rib. These holes serve as location means through each of which a small nylon clip 19 extends to secure to the rib a rubber tie band 20. Each rubber tie band encircles the hose and extends around the power cable 14 which is positioned substantially diametrically opposite the support rib 16. Each tie band is arranged to cross-over on itself between the hose and cable so as to lie in a FIG. 8 configuration as viewed in cross-section (see FIG. 3), and ends 21 of the band are secured one to the other in the region of the rib 16. Alternatively the tie band 20 may pass directly through hole 18 as seen in FIG. 5.

Figure 4:
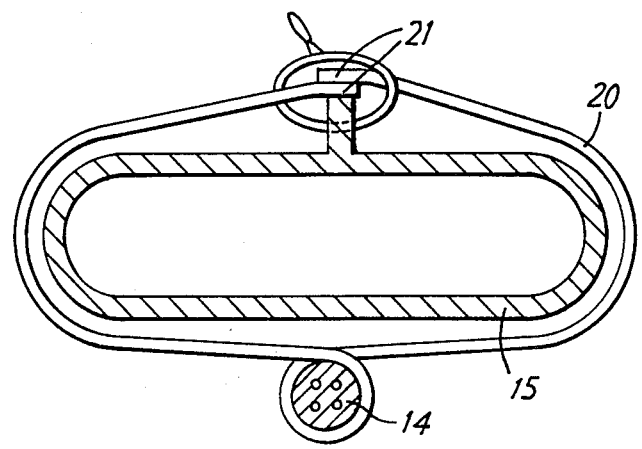
FIG. 4 is a view similar to FIG. 3 but showing the hose in an unpressurized condition.

FIG. 4 shows in cross-section the configuration adopted by the hose assembly in the absence of internal pressure, with the hose in a substantially flat condition.

In the arrangement shown in FIG. 1 the hose 12 serves not only to support the pump 10 and provide a fluid passage between the pump and ground level pipework 11, but also supports and guides the cable 14. Particularly if the cable is pre-attached to the whole length of the hose 12 the assembly of the hose, pump and cable may be lowered into the bore of a well more speedily than if the cable has to be attached stepwise to the sections of steel pipe. In an alternative method of installation the cable may be attached to the hose as the latter is lowered into the well bore, though in this case the time savings are not so great. In both above described methods a safety chain or hawser, if provided, can be lowered simultaneously with the hose, pump and cable assembly.

The above described method of attachment of a cable to a hose may be employed also for the attachment of a dip tube to the hose for measurement of the well water level. Either the single rib 16 above described may be employed for location of tie means to support both the power cable and dip tube or the hose may incorporate additional support means, such as a second rib, for the purpose of support of the dip tube and associated tie means.

Although the invention has been described specifically in the context of a layflat well riser hose suitable for supporting a pump power cable, flexible hose in accordance with the present invention may be employed in other applications where it is required that a hose support another body or where the hose itself is required to be supported at intervals along its length.

The invention is particularly applicable to hose of the layflat type which cannot readily be gripped around its circumference by the use of clamps or straps encircling the hose. The invention serves to ensure that any tendency for the power cable, or other elongate article, to slip longitudinally relative to the hose is resisted, while the use of tie means to position the elongate article at a position remote from the support means enables small relative axial movements, due to temperature of pressure effects, to be accommodated.

Positioning of the supported elongate article remote from rather than alongside the support means further results in the particular advantage that the support means does not require to be as robust and strong as would be necessary to support the full weight of the article—which is considerable in the case of a power cable. The tie means extending between the support means and the remotely positioned elongate article results in the weight of the article tending to pull the support means against rather than away from the hose body, and the consequential frictional interaction between the tie means and hose results in much of the weight of the elongate article being transmitted direct to the hose body and not having to be withstood by the support means.

Having now described our invention what we claim is:

1. A thermoplastic hose which is flexible in cross section and which has molded integrally therewith a support rib extending generally continuously along the length of the hose and means securing tie means to said support rib and extending around at least part of the periphery of the hose for encircling and supporting an elongate article on the periphery of the hose at a position remote from said support rib.

2. A flexible hose according to claim 1 wherein the tie means extends around the entire periphery of the hose.

3. A flexible hose according to claim wherein the support rib extends continuously along the length of the hose.

4. A flexible hose according to claim 1 wherein the support rib has location holes formed therein at spaced positions along the length of the hose.

5. A flexible hose according to claim 4 wherein tie means extends through said holes.

6. A flexible hose according to claim 1 wherein the tie means is formed of an elastic material.

7. An assembly comprising a flexible hose according to claim 1 and an elongate article secured to said hose.

8. An assembly according to claim 7 wherein part of the tie means lies between the hose and the elongate article.

9. An assembly according to claim 8 wherein tie means individually encircles the hose and elongate article.

10. An assembly according to claim 7 wherein the elongate article is in a slack condition between successive points of location.

11. An assembly according to claim 7 wherein the flexible hose is a hose of the layflat type.

12. Method of supporting an elongate article relative to a hose which is flexible in cross section comprising providing a flexible hose of the kind having a support rib provided at least at intervals along the length of the hose, positioning the elongate article at a position remote from the support rib, encircling the elongate article with tie means and securing the tie means at intervals along the length of the hose to extend around at least part of the periphery of the hose between the support means and elongate article.

13. Method according to claim 12 wherein the elongate article is positioned substantially diametrically opposite the support means.

14. Method according to claim 12 wherein the elongate article and hose are each individually encircled by the tie means.

15. Method according to claim 12 wherein on assembly the elongate article is arranged to lie in a slack condition between successive points of location.

16. A hose of the lay-flat flexible type having a reinforcement structure embedded therein and a plurality of flexible ties secured to the hose at one side of the hose, which ties are spaced apart lengthwise of the hose and extend around at least part of the periphery of the hose for encircling and supporting an elongate article on the periphery of the hose at a position remote from said one side.

17. A hose as claimed in claim 16, wherein the hose has an external rib extending substantially continuously lengthwise thereof.

18. A hose as claimed in claim 17, wherein the rib in moulded integrally with the hose.

* * * * *

UNITED STATES PATENT AND TRADEMARK OFFICE
CERTIFICATE OF CORRECTION

PATENT NO. : 4,470,433
DATED : September 11, 1984
INVENTOR(S) : Stanley N. VIPOND; Craig J. LITSTER It is certified that error appears in the above—identified patent and that said Letters Patent is hereby corrected as shown below:

On the title page,
The Assignee information on the first page (title page) should read:

-- Assignee: ANGUS FIRE ARMOUR LIMITED, Lancaster, England.--

Signed and Sealed this

Twelfth Day of March 1985

[SEAL]

*Attest:*

DONALD J. QUIGG

*Attesting Officer*  *Acting Commissioner of Patents and Trademarks*